INVENTOR.
ERNEST G. SCHULZE

BY Placheh & Saulsbury

ATTORNEYS

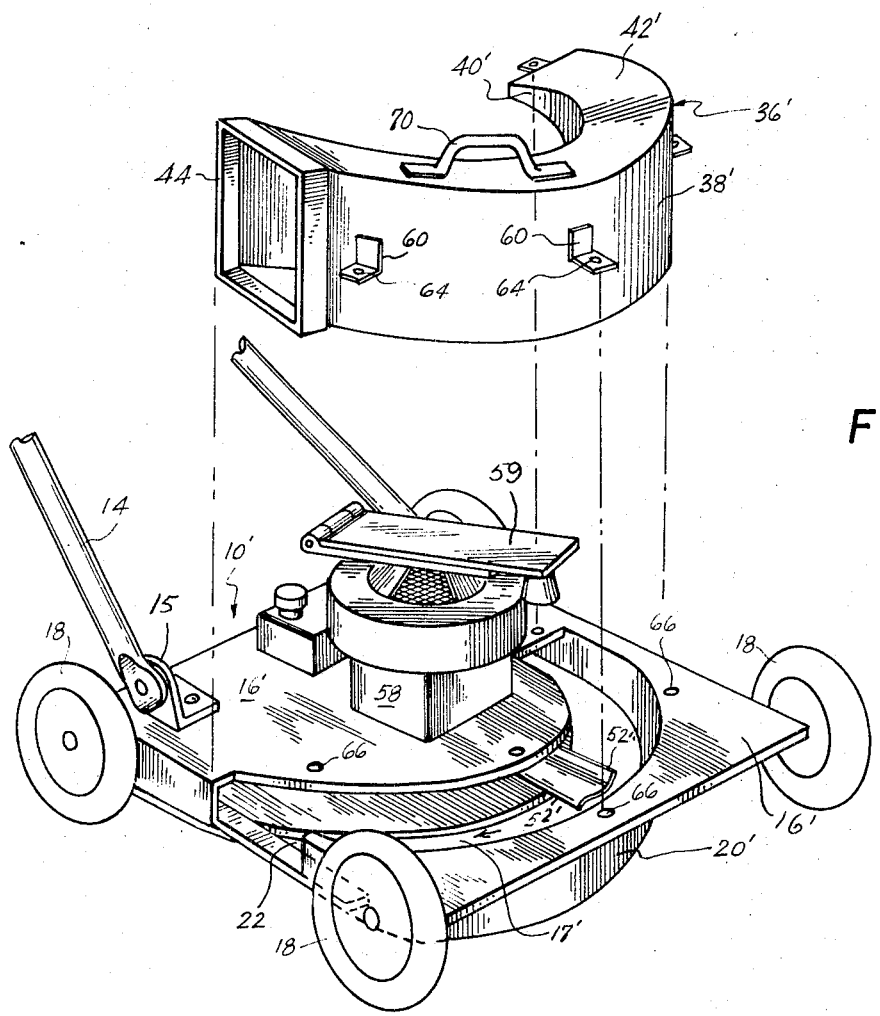
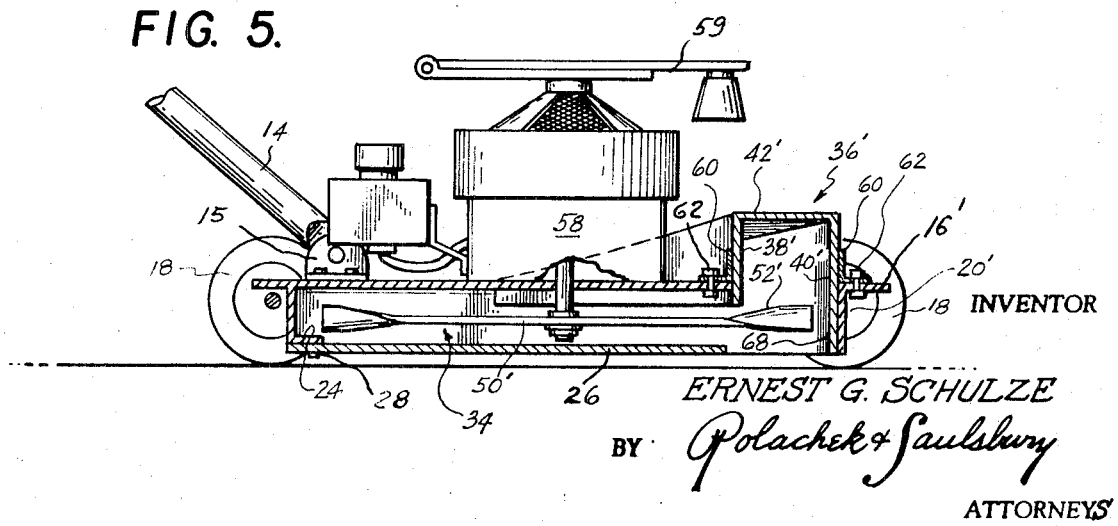

United States Patent Office 3,541,771
Patented Nov. 24, 1970

3,541,771
LAWN MOWER INCLUDING BOTTOM GUARD PLATE
Ernest G. Schulze, 78 Black Oak Ridge Road,
Wayne, N.J. 07470
Filed Apr. 15, 1968, Ser. No. 721,362
Int. Cl. A01d 55/18
U.S. Cl. 56—255      7 Claims

ABSTRACT OF THE DISCLOSURE

A lawn mower having means for cutting grass, entraining the cut grass on air currents and carrying the entrained cut grass to an outlet frame adapted to be connected to a collecting device for disposal of the grass. The mower includes a platform on wheels for transporting the same over the surface of a lawn. A rotatable cutting device is carried underneath the platform in a compartment. The blades rotate well above the lower edge of the skirted platform and are shaped to cut the grass and create an upright draft of air in the compartment. A guard-plate for the blades extends over at least 70% of the area of the underside of the platform and prevents lawn scalping. The guard-plate has a V-shaped forward edge defining with the skirted platform a crescent shaped opening of minimum cross sectional area and maximum circumferential length to maximize suction and cutting action of the blades at the cresent shaped opening while minimizing suction and preventing back pressure at the rear of the compartment. A spiral integral or removable duct is adapted to carry the entrained cut grass to an outlet to which a collector may be attached.

---

This invention relates generally to rotary lawn mowers and more specifically to a guard-plate covering a substantial amount of the cutting area and a removable channel member made of fracture-resistant material, fitting into the platform of the mower, to carry out grass to a discharge opening.

All rotary mowers, when urged in a forward direction, although the blade travels a full 360°, do all of their cutting in a semi-circle of approximately one inch in width at the front of the mower unless the direction of the mower is reversed which manufacturers regard as dangerous. The rest of the blade action only generates a large amount of unwanted back pressure. This back pressure seeks an exit. The outlet provided, not being of sufficient area, causes this pressure to blow out at the perimeter of the mower, blowing cut grass, leaves and other material including loose weed seeds away from the mower. Also the blades are left unprotected against small mounds of earth, stones and other foreign matter in the lawn. These other mowers are also very dangerous in that a hand or foot accidentally put beneath the skirted platform is subject to severe injury. Another fault is that in cutting damp grass, this wet cut grass accumulates under the skirted platform eventually clogging the discharge opening and is often difficult to remove. Often a stone or other foreign objects are thrown up by the blades against the interior of the platform fracturing or puncturing same. Some manufacturers line the interiors of the platform with puncture proof material but this is very expensive. These other mowers do not generate enough suction to gather all cut grass, leaves and other material including loose weed seeds into the mower so as to leave a well groomed lawn.

The principal object of the invention is to overcome the above disadvantages associated with conventional rotary lawn mowers by providing adequate guard-plate means for use with impellered cutting blades to create desirable greater suction power and eliminate undesirable back pressure, to increase safety, prevent lawn scalping and to lessen the chance of blade damage.

Another object of the invention is to provide within a lawn mower, a spiral removable channel member made of fracture-resistant material designed to carry off the cut grass, leaves and other matter. This channel is inserted into the platform above the crescent-shaped opening to prevent damage to the mower platform from occasional stones picked up by the blades.

For a better understanding of the invention, reference may be had to the following detailed description taken in connection with the accompanying drawing in which:

FIG. 4 is an exploded perspective view of a lawn mower according to a modified form of the invention, the channel member being removed from the platform.

FIG. 5 is a view similar to FIG. 2 of the lawn mower shown in FIG. 4.

Figure 1:
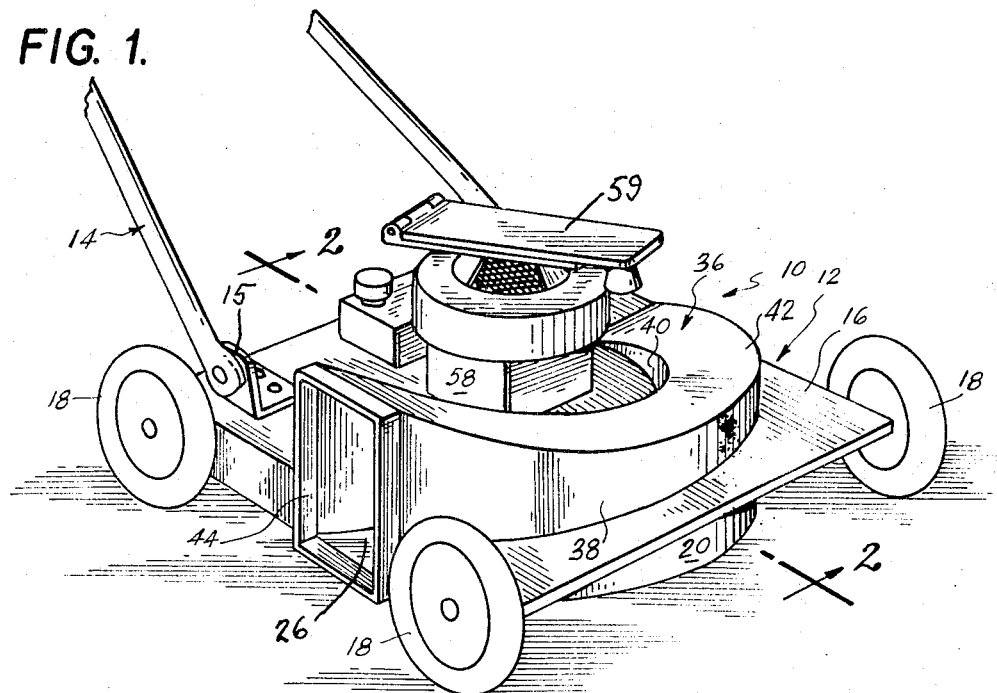
FIG. 1 is a top perspective view of a lawn mower made according to one form of the present invention.
Figure 2:
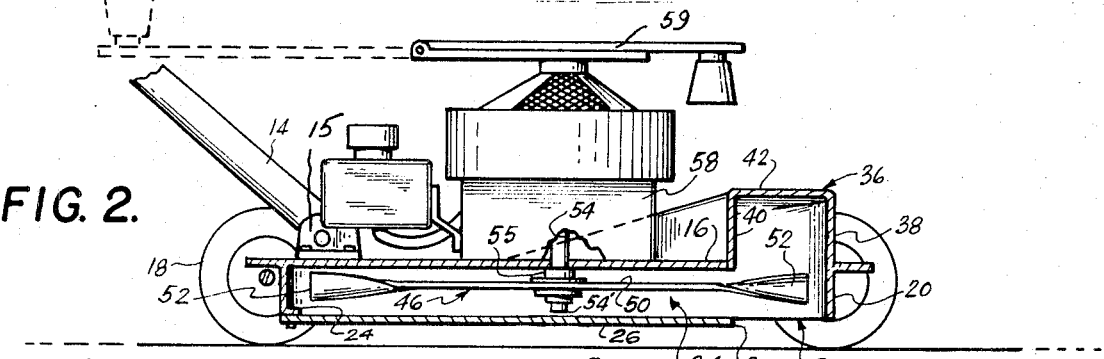
FIG. 2 is a longitudinal sectional view thereof taken along the line 2—2 of FIG. 1.

Referring now in detail to the various views of the drawing. In FIG. 1 a lawn mower made in accordance with the invention is shown and designated generally at 10. The lawn mower 10 comprises generally a mobile platform or frame 12 such as a wheeled carriage adapted to be pushed along the ground by means of an upwardly and rearwardly inclined handle structure 14, the lower portion of the handle structure being bifurcated and preferably hingedly connected at its ends to hinge brackets 15 upon the frame 12.

The mobile platform or frame proper comprises a horizontal rectangular platform portion 16 to which ground wheels 18 are rotatably secured at the front and rear extremities on either side thereof.

Figure 3:
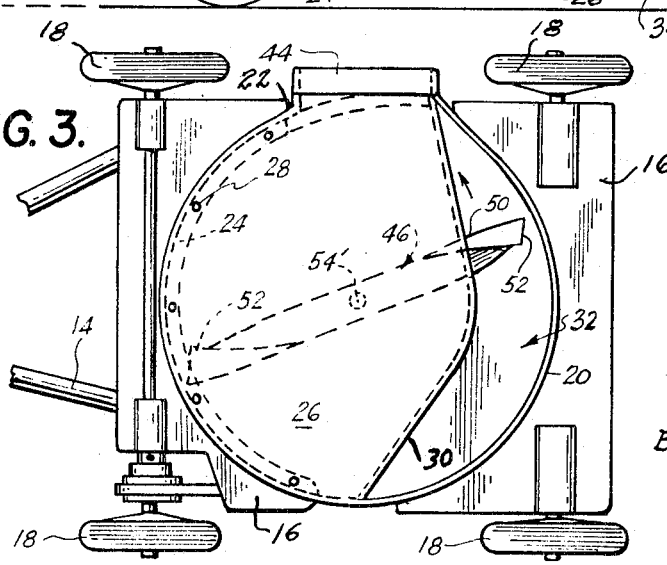
FIG. 3 is a bottom plan view thereof.

A cylindrical skirt portion 20 depends from the platform 16 and formed integrally therewith, the skirt portion being cut away as indicated at 22. The bottom edge of the skirt is formed with an inwardly extending perpendicular flange 24 extending substantially halfway around the skirt. A guard-plate 26 is secured to this flange 24 at the bottom of the skirt 20 by bolts 28 and is cut away as indicated at 30 leaving a crescent-shaped opening 32 between the forward V-shaped edge of the plate 26 and the cylindrical skirt 20. The forward V-shaped edge of plate 26 defines an angle of about 160° as clearly shown in FIG. 3. Opposite ends of this V-shaped edge terminate at skirt 20 at points spaced about 160° apart circumferentially of the skirt. The crescent shaped opening 32 has minimum cross sectional area and maximum circumferential length. This arrangement insures maximum suction at opening 32 and maximum affecting cutting sweep of the cutting blades. The platform portions 16, plate 26 and an integral channel portion 36 define an inverted channel-shaped compartment 34. The vertical dimensions of skirt portion 20 is such that the open compartment 32 is in close proximity with the ground surface.

The integral inverted channel-shaped portion 36 extends upwardly and has an increasing cross-sectional area to carry the updraft of air and cut material entrained thereon away from the crescent-shaped opening 32. This channel portion 36 has an outer wall 38 extending down below the cutting blades and an inner wall 40 extending down to slightly above the rotating impellered cutting blade bar 46. Walls 38 and 40 are joined by a top wall 42. The channel portion is also formed generally as an upwardly spiraling, laterally extending hood or shroud of substantially uniform width and varying cross-section enclosing a region above the platform 16 and in communication with the crescent-shaped opening 32. At its larger open end, the channel portion supports a rectangular frame 44 serving as an outlet for the channel portion and for attachment of a collector thereto for the cut material.

The rotating cutting blade device 46 rotates through compartment 34, and consists of an elongated metal bar 50 with twisted, sharpened, pitched impellered ends constituting blades 52. The bar 50 is of a length slightly less than the inner diameter of the compartment 34. It is to be noted that the blade ends 52 of the cutting device 46 may be of any suitable configuration for cutting grass as well as creating updrafts of upwardly spiraling air currents. Such updrafts of air are effective in urging bent over blades of grass to upright position for efficient and neat cutting action by the rotating blade and cutting edges and in addition provide a medium upon which the cut grass and other material extraneous to the lawn will be entrained and thereby drawn upwardly within the channel portion 36. The cutting blade 50 is mounted for rotation about a central vertical motor axis within compartment 34 preferably by means of an elongated vertical drive shaft 54 rigidly attached at one end to the center of the cutting blade 50. Shaft 54 is rotatably mounted within compartment 34 by means of a bearing collar 55. The shaft 54 extends through a central hole in platform 16 and the upper end of the shaft is rigidly connected to a prime mover or motor 58 which may be a small internal combustion engine that has an extensible crank 59 or an electric motor carried by platform 12. It will be understood that the length of the shaft 54 is such that the horizontal plane of rotation of the blade ends 52 of the blade bar 50 is in close proximity to the ground surface whereby the edges of the blades will contact standing grass at points near the ground surface and yet are protected within and below by the lowered edge of the skirt portion 20. Any upward pressure upon the guard-plate 26 may cause it to abut the lower end of shaft 54 and give support to the plate, but normally the plate is but slightly spaced therefrom.

In operation, the motor or prime mover 58 is first energized to impart rotary movement through drive shaft 54 to the horizontal cutting bar device 46 and mobile frame 12 is propelled over the lawn as by an operator exerting force on handle structure 14. The sharpened ends or blades 52 of the rotating cutting device cuts grass which is urged to an upright position in the crescent-shaped opening 32 by the updraft of air developed therein due to the rotary motion of the pitched impellered blades 52. Leaves and other material extraneous to the lawn surface are also entrained on the updraft of air and are sucked upwardly into the crescent-shaped opening 32 into the plane of cutting blades 52, such materials being thereby pulverized in encountering the cutting blades. The updraft of air and cut material entrained thereon is then forced into channel portion 36. The cut material received in channel portion 36 is entrained on circular directed air currents therein, which air currents convey the cut material through the channel portion 36 and out through the outlet frame 44.

The guard-plate 26 constitutes an important feature of this invention. It covers over 70% of the bottom of the platform where all blade action takes place thereby leaving only the long narrow crescent-shaped opening 32 at the front of the mower for intake or suction. This crescent shape of opening 32 is important because the opening has minimum area and maximum circumferential length. Thus the cutting blades 52 are exposed for a maximum angular sweep of about 160° at the front of the mower, and at the same time suction is maximized by the narrow width of the opening. Over the rest of the compartment 34, sealed by the guard-plate 26, there is only turbulence, without suction or pressure being developed by the blade action. Thus, the amount of vacuum is greatly increased at opening 32 causing greater suction to be exerted on the grass at its cut from the lawn. The guard-plate 26 in cooperation with the channel portion 36, eliminates substantially all back pressure in compartment 34.

The channel portion 36, furthermore is so designed to provide greater exhaust area than intake area along its entire length. The blade bar 50 is recessed up to ½" from the bottom edge of the skirt portion 20 of the frame. This feature, in conjunction with the guard-plate 26, creates a safety feature in that feet and hands cannot be injured unless they are raised up into the path of the blades 52 at the crescent-shaped opening 32 only at the front of the mower. Also this combination of plate and recessed blades will definitely prevent the blades from scalping the lawn and lessen the chance of blade damage from hitting foreign objects in the lawn.

The projected end 54' of the drive shaft, positioned slightly above the inside of the plate, acts as a safety stop in the event the mower goes over a high spot in the lawn thereby preventing the plate 26 from being forced up into the cutting bar device 46.

The modified form of lawn mower 10', shown in FIGS. 4 and 5, differs from the lawn mower 10 of FIG. 1 in that a channel member 36' is removably mounted into the platform 16'. The channel member seats in a slot 17' in the platform 16' and is removably secured thereto by means of L-shaped brackets 60 welded to the outer and inner walls 38' and 40', respectively, of the channel member 36' and by means of fastening elements 62 passing through perforations 64 in the brackets and through perforations 66 in the platform 16'. The outer wall 38' of the channel member 36' is widened as indicated at 68 extending downwardly inside of the skirt 20', which is formed integrally with the platform 16' to the bottom edge of the skirt. A handle 70 is suitably fastened to the top wall 42' of the channel member 36' by which it can be removed from the platform 16 when the fastening elements 62 are removed. The metal bar 50' of the cutting device has its ends being formed with sharpened blade edges 52' and air impelling portions 52".

The channel member 36' being removable, any wet grass accumulated therein is easily removed therefrom. The channel member 36' is made of fracture-resistant material or high impact plastic that can withstand stones flung against it while the platform or frame 16' can be made of more destructible cast metal such as light weight aluminum.

While I have shown and described what I believe to be the best embodiments of my invention, it will be apparent to those skilled in the art that various changes and modifications may be made therein without departing from the spirit and scope of the invention as defined in the appended claims.

What is claimed is:

1. A lawn mower, comprising a mobile frame adapted to be guided over a lawn surface, said frame including a platform portion, a cylindrical skirt portion depending from the platform, a substantially semicircular guardplate fixed on the bottom edge of the skirt throughout the rear portion thereof and covering about 70% or the bottom area of the frame, said guard-plate having a V-shaped forward edge defining with said skirt a crescent shaped opening extending about 160° circumferentially of the skirt, said platform, skirt and plate defining a compartment, a semicircular open channel portion mounted on the platform over said opening, said channel portion extending from one side to the other of the platform, said channel portion spiraling upward from the platform, overlying and communicating with said opening, said channel portion being open at one end and at the bottom and supporting an outlet frame for a collector to be fixed thereto, and a motor driven cutting device including impeller blades mounted for rotation about a vertical axis centrally of the compartment, said blades being exposed for an effective cutting sweep of about 160° in said crescent shaped opening to create upon rotation an updraft of air in said compartment, so that material cut by the blades is entrained by strong air currents in said updraft for efficient passage through the channel portion and delivery to the outlet frame whereby the guard-plate seals said compartment to suction and pressure developed by rotation of the blades in the cresent shaped opening and prevents back pressure in the compartment.

2. A lawn mower as defined in claim 1, wherein the cutting device includes an elongated metal bar with its ends sharpened, twisted and pitched to provide air impelling portions.

3. A lawn mower as defined in claim 1, wherein the skirt portion has a cutaway portion communicating with the space between the guard-plate and skirt and communicating with said compartment.

4. A lawn mower as defined in claim 1, wherein the channel portion is of uniform width and of varying cross-section throughout its length, and wherein the outlet frame is connected to the largest area portion of the channel portion.

5. A lawn mower as defined in claim 1, wherein the cutting device includes an elongated metal bar with its ends sharpened, twisted and pitched to provide air impelling portions, and wherein the skirt portion has a cutaway portion communicating with the space between the guard-plate and skirt portion and communicating with said compartment.

6. A lawn mower as defined in claim 1, wherein the cutting device includes an elongated metal bar with its ends sharpened, twisted and pitched to provide air impelling portions, and wherein the channel portion is of uniform width and of varying cross-section throughout its length, and wherein the outlet frame is connected to the largest area portion of the duct.

7. A lawn mower as defined in claim 1, wherein the cutting device includes an elongated metal bar with its ends sharpened, twisted and pitched to provide air impelling portions, the skirt portion having a cutaway portion communicating with the space between the guard-plate and skirt portion and communicating with said compartment, the channel portion being of uniform width throughout and of varying cross-section throughout, the outlet frame being connected to the widest portion of the channel portion.

References Cited

UNITED STATES PATENTS

| | | | |
|---|---|---|---|
| D. 168,064 | 10/1952 | Morris et al. | 56—25.4 X |
| 3,002,331 | 10/1961 | Denney | 56—25.4 |
| 3,118,267 | 1/1964 | Shaw | 56—25.4 |
| 3,199,277 | 8/1965 | Moody | 56—25.4 |

RUSSELL R. KINSEY, Primary Examiner

J. N. ESKOVITZ, Assistant Examiner